(12) United States Patent
Thomas

(10) Patent No.: US 11,651,146 B2
(45) Date of Patent: May 16, 2023

(54) SYSTEM AND METHOD FOR CONFIGURING RELATED INFORMATION LINKS AND CONTROLLING A DISPLAY

(71) Applicant: ORACLE INTERNATIONAL CORPORATION, Redwood Shores, CA (US)

(72) Inventor: Tony P. Thomas, Changanacherry (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/722,575

(22) Filed: Apr. 18, 2022

(65) Prior Publication Data
US 2023/0042782 A1 Feb. 9, 2023

Related U.S. Application Data

(63) Continuation of application No. 17/392,590, filed on Aug. 3, 2021, now Pat. No. 11,314,928.

(51) Int. Cl.
| | |
|---|---|
| *G06F 40/166* | (2020.01) |
| *G06F 9/451* | (2018.01) |
| *G06F 3/0482* | (2013.01) |
| *G06F 3/0483* | (2013.01) |
| *G06F 16/955* | (2019.01) |

(52) U.S. Cl.
CPC .......... *G06F 40/166* (2020.01); *G06F 3/0482* (2013.01); *G06F 3/0483* (2013.01); *G06F 9/451* (2018.02); *G06F 16/9558* (2019.01)

(58) Field of Classification Search
CPC .................................................. G06F 40/166
See application file for complete search history.

(56) References Cited

U.S. PATENT DOCUMENTS

| | | |
|---|---|---|
| 6,874,019 B2 | 3/2005 | Hamilton, II et al. |
| 7,168,034 B2 | 1/2007 | Hennings et al. |
| | (Continued) | |

FOREIGN PATENT DOCUMENTS

| | | |
|---|---|---|
| CN | 101042650 A | 9/2007 |

OTHER PUBLICATIONS

Yoast; Yoast Seo for Everyone; How Many Internal Links Does a Post Have? Find Out the Easy Way!; pp. 1-5; downloaded Apr. 29, 2021 from: https://yoast.com/how-to-use-the-text-link-counter/.

(Continued)

*Primary Examiner* — James J Debrow
(74) *Attorney, Agent, or Firm* — Kraguljac Law Group, LLC

(57) ABSTRACT

Systems, methods, and other embodiments associated with configuring related links and controlling of a display are described. In one embodiment, in response to a user activating a data page on a user interface, wherein the data page includes a plurality of input fields for receiving input values: monitoring the plurality of input fields for inputted values. When a first value is input into a first input field of the plurality of input fields, the system (i) identifies related links assigned to the first input field, (ii) counts a number of the related links that are assigned to the first input field, and (iii) generates and displays, on a display, a graphical badge that includes the number of the related links to inform the user that related links are available for the first input field.

20 Claims, 12 Drawing Sheets

(56) References Cited

U.S. PATENT DOCUMENTS

| | | |
|---|---|---|
| 8,943,425 B2 | 1/2015 | Wickramasuriya et al. |
| 9,092,544 B2 | 7/2015 | Cahill |
| 9,274,790 B2 | 3/2016 | Marimuthu et al. |
| 9,563,617 B2 | 2/2017 | Marimuthu et al. |
| 10,210,142 B1 | 2/2019 | Jain et al. |
| 2021/0342785 A1* | 11/2021 | Mann et al. ........... G06Q 10/10 |

OTHER PUBLICATIONS

Andrew Hutchinson; Facebook's Testing New Color Highlighting for Links and Hashtags in Post Text; Published Feb. 19, 2020 in Social Media Today; pp. 1-4; downloaded Apr. 29, 2021 from: https://www.socialmediatoday.com/news/facebooks-testing-new-color-highlighting-for-links-and-hashtags-in-post-te/572479/.

Microsoft; Query by link or attachment count—Azure Boards / Microsoft Docs; Mar. 29, 2021; pp. 1-10; downloaded on Apr. 29, 2021 from: https://docs.microsoft.com/en-us/azure/devops/boards/queries/linking-attachments?view=azure-devops&tabs=browser.

Olston et al.; ScentTrails: Integrating Browsing and Searching on the World Wide Web; pp. 1-8; downloaded Apr. 21, 2021 from: https://citeseerx.ist.psu.edu/viewdoc/download?doi=10.1.1.160.5400&rep=rep1&type=pdf.

SmallSEOTools; Website Links Count Checker; pp. 1-6, downloaded on Apr. 29, 2021 from: https://smallseotools.com/website-links-count-checker/.

* cited by examiner

Define Configuration
Page: Assess the securing impact for your feature

Links Configuration

| Field | Criteria | Value | Link | Description |
|---|---|---|---|---|
| Have you created new REST API? | = | Y | S10 | Rest API Check List |
| Have you created new VO? | = | Y | S5 | Updating Data Security |
| Have you created new REST API? | = | Y | S3 | Update REST and Navigation Security |

[Add] [Remove]  [Save]

FIG. 5

Define Configuration
Page: Invoice Entry

Links Configuration

| Field | Criteria | Value | Link | Description |
|---|---|---|---|---|
| Business Unit | = | US2 | INV3 | Filing Invoice for Business Unit US2 |
| Amount | >= | 10,000 | INV8 | Approvals for Higher Amounts |
| Supplier | = | XYZ | INV1 | Filing Invoice for Supplier XYZ |

Add Remove

Save

FIG. 6

| LINKS_ID | CLASS | DISPLAY_NAME | LINK | DESCRIPTION |
|---|---|---|---|---|
| S10 | SECURITY | REST API Checklist | https://link1023.... | Checklist for any new REST to be created |
| S1 | SECURITY | UI Security Guide | https://link1234.... | Developers guide to implement UI security |
| S2 | SECURITY | Steps on Security | https://link234.... | Documentation on how to work on security... |
| S3 | SECURITY | Uptake REST | https://link345.... | Steps to implement REST security and nav |
| ... | | | | |
| SN | SECURITY | Demo Users | https://link.nnn.... | Demo user list in PSCR |

FIG. 7

SYSTEM AND METHOD FOR CONFIGURING RELATED INFORMATION LINKS AND CONTROLLING A DISPLAY

CROSS REFERENCE TO RELATED APPLICATION

This disclosure is a continuation of and claims the benefit of priority to U.S. patent application Ser. No. 17/392,590, issued as U.S. Pat. No. 11,314,928, entitled "System and Method for Configuring Related Information Links and Controlling a Display," filed Aug. 3, 2021, which is incorporated herein by reference in its entirety for all purposes.

BACKGROUND

In enterprise resource planning (ERP) and human capital management (HCM) applications, while a user is reviewing any particular page there would be a feature to list links to other pages that show additional information to the current page. This is often referred as Related Content/Links/Information. The links to related pages are grouped as a widget/menu/dropdown and placed on the data pages at a standard location based on the application's standards. Often these links contain related information to help the user complete actions on the current data page the user is reviewing. However, the problem is that it is very likely that this related information is overlooked by the user or the user may be unaware that there is some further information available in the widget/menu/dropdown which might be helpful to complete the action that the user is currently doing. Furthermore, the trained staff may be aware of the features/contents available in the widget/menu/dropdown, but not the users. So, in effect, even though the ERP/HCM applications deliver these features of related content/link/information, they may not be used to their full potential by the end users. Therefore, it would be desirable to have a framework that is able to notify and highlight the related links/content/information among a complete list of available related links/content/information based upon a change in the data context the user is dealing with.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 5 illustrates one embodiment a user interface for defining of the data page configuration.

FIG. 6 illustrates another embodiment of the user interface for defining of the data page configuration on a user interface.

FIG. 7 illustrates one embodiment of a links table wherein the metadata of each related content for a data page is stored.

DETAILED DESCRIPTION

Figure 1:
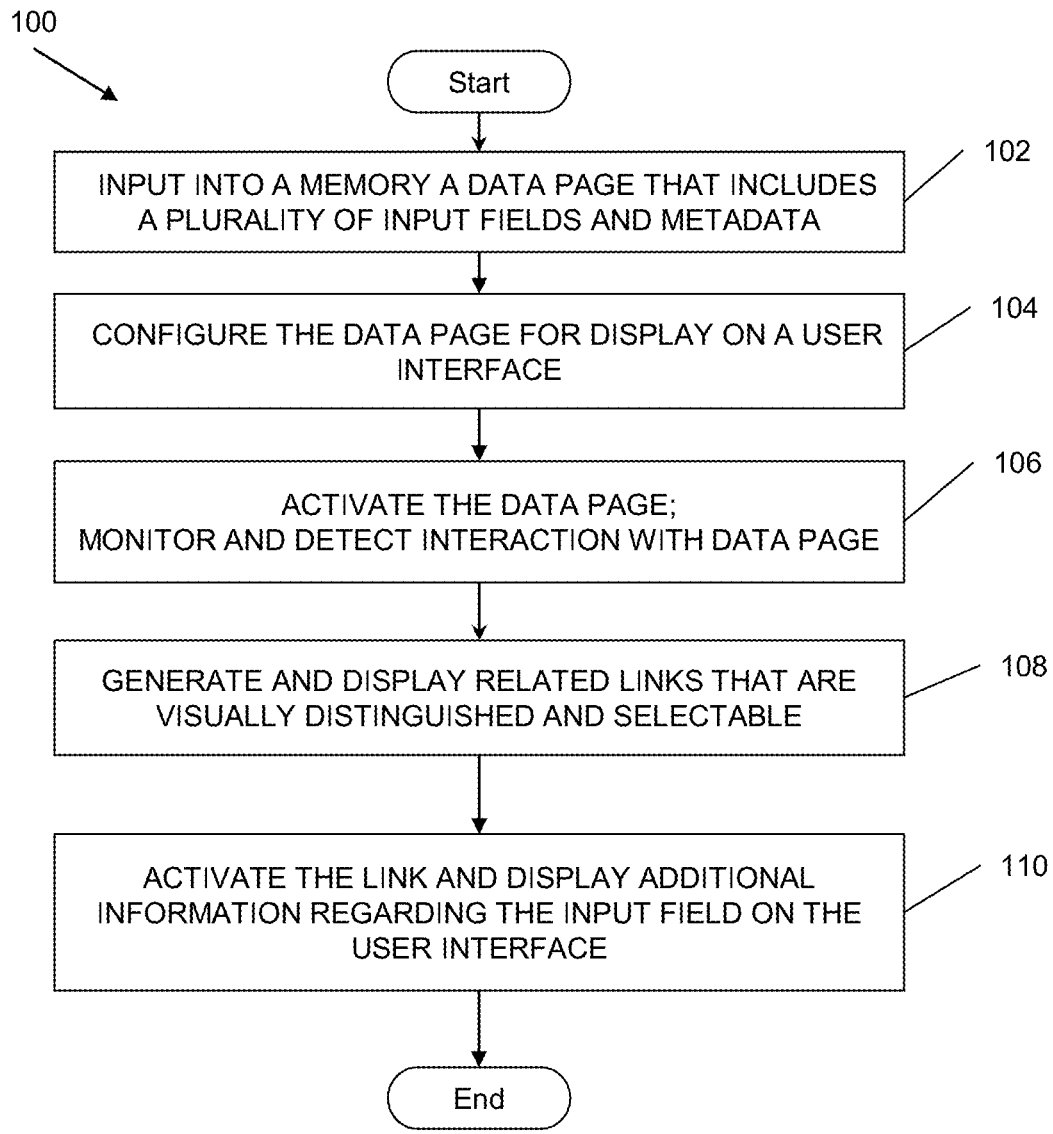
FIG. 1 illustrates one embodiment for a method for configuring related links and controlling a display.

Systems and methods are described herein that implement a technique for configuring related links and controlling a display. In one embodiment, a page link configuration system/module is described that provides a technique and framework to configure a data page that includes a plurality of input fields and metadata, wherein the metadata includes a plurality of related links. The metadata is not visible on the data page and the related links are not visible until a function or action is selected to display the related links. In one embodiment, the related links are active hyperlinks that when selected, display (or navigate to) additional information that has been associated with the content of the data page and/or a particular input field on the data page. Thus, the hyperlinks are "related" to the content and/or the input fields on the data page. After the data page has been configured, the plurality of input fields is monitored for input values to determine if a user activates the data page on a user interface by entering/inputting values into one or more of the plurality of input fields. A determination is made to see if the input values trigger a criterion that causes the system to provide information on the related links to the user.

The information on the related links can then be provided in the form of a graphical badge. In one embodiment, the graphical badge is generated to help a user identify hidden information about the related links, which is an improvement over previous systems. The graphical badge includes a number to notify and inform the user that a certain number of related links are available. The information on the graphical badge helps the user identify and not overlook the information that is most likely hidden but available through the related links, which is an improvement over prior systems. Finally, the information helps new users and reduces training costs by automatically providing additional information and/or explanations related to input fields on a data page. This additional information associated with the links may provide explanations about what type of values are expected to be entered into the input field, which otherwise was hidden or difficult to find in prior systems. Thus, the present system provides an improved page configuration.

Furthermore, the technique for configuring related links and controlling a display can capture the related links mappings to the related information as configurations, thereby helping administrators in each organization to create their own rules for the ERP/HCM application. In one embodiment, each link on the page will be tagged to a specific link identifier called a LinkID. On the configuration page, the administrators can select the pages first and then the input fields on the page. The present page link configuration system provides functions to allow the administrators to link an input field to a LinkID and define the criteria to trigger the link. Thus, the present system is configured to automatically trigger a notification about related links which may be hidden from the displayed page. This is another improvement over prior system which were not capable of performing such functions.

System Overview

With reference to FIG. 1, a computer-implemented method 100 is illustrated that describes one embodiment for configuring related links and controlling a display. Method 100 includes two phases/stages of operation where one phase (configuration phase: blocks 102, 104) configures a data page with link assignments and a second phase (operation phase: blocks 106, 108, 110) executes on a configured data page in real-time to control a display screen with new graphics/information, which occurs after the data page is configured. The method 100 is performed by at least a processor of a computer system that accesses and interacts with memories and/or data storage devices. For example, the processor at least accesses and reads/writes data to the memory and processes network communications to perform the actions of FIG. 1. Method 100 will be described using an example data page 200 shown in FIG. 2.

Figure 2:
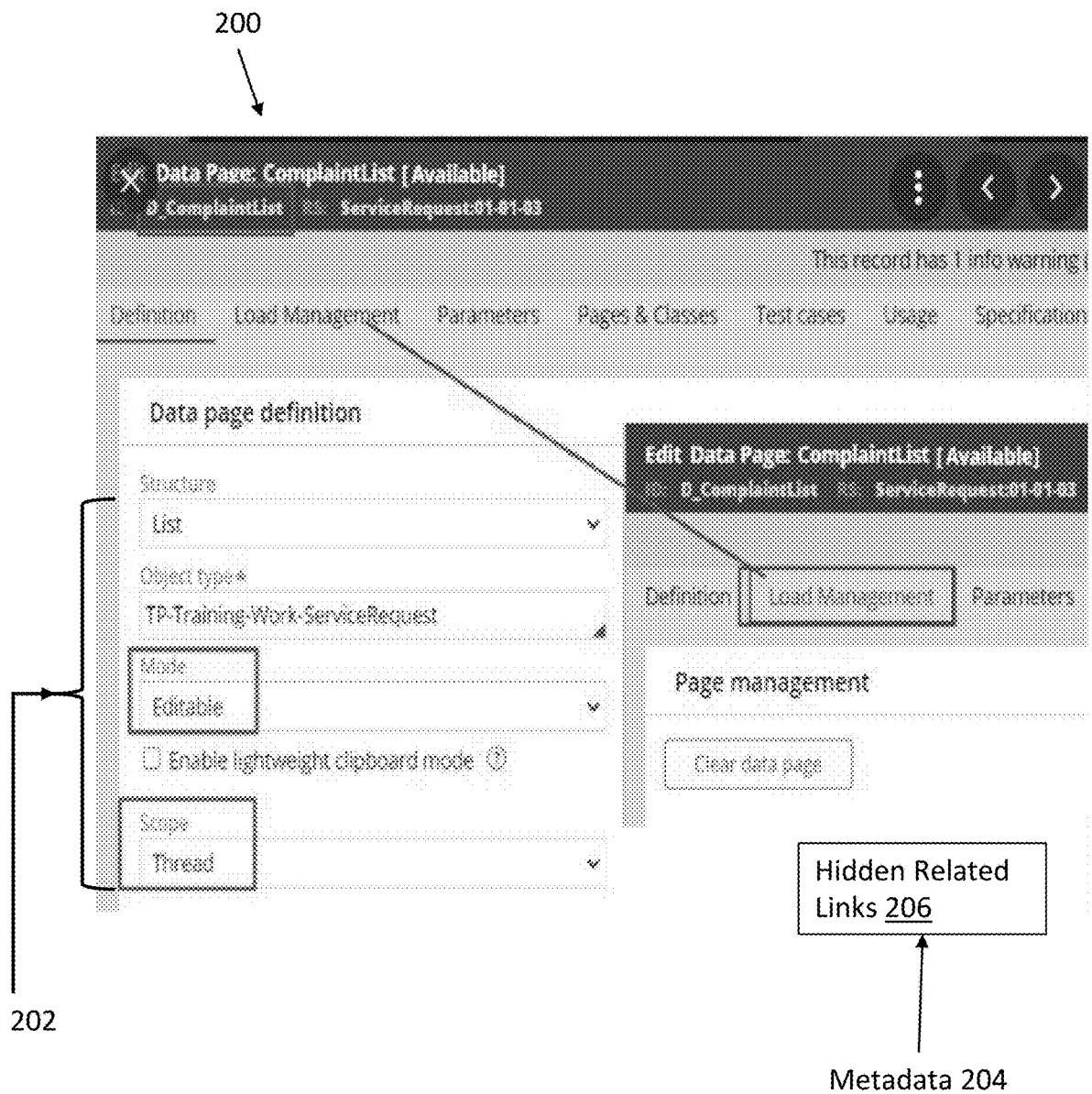
FIG. 2 is a schematic illustration of a data page associated with FIG. 1

With reference to FIGS. 1 and 2, at 102, the method 100 is initiated when the system administrator selects and inputs into a memory 1204 (FIG. 12), a data page 200 (FIG. 2). The data page 200 (titled "CompliantList") may be a form or other page that includes a plurality of input fields 202 that are visible on the data page, and includes metadata 204 that is not visible on the data page 200 but is part of the configuration of the data page. For example, the metadata 204 includes a plurality of related links 206 that are initially not visible on the data page 200 but may be displayed when a function/action is selected to display the related links. This display function will be described later. In general, the related links are associated to the data page 200 (e.g., defined in the metadata) when the data page 200 was originally created. It is to be understood that the metadata 204 may also include other related information available/configured for each of the data pages 200, as will be discussed in greater detail later.

In block 104 of FIG. 1, a user interface is displayed that is configured to allow an administrator to configure the selected data page 200 with assignments of related links to input fields and rules to trigger related links. Block 104 describes a page link configuration process and will be described in greater detail with respect to FIG. 3 and FIG. 5.

After the data page is configured with link assignments in block 104 (see FIG. 5 link assignments), the data page is ready for real-time operation. The operation of present system for processing the configured data page includes blocks 106, 108, and 110. The following is a brief summary and overview of these blocks. Detailed explanations are provided below with reference to other figures.

Figure 9:
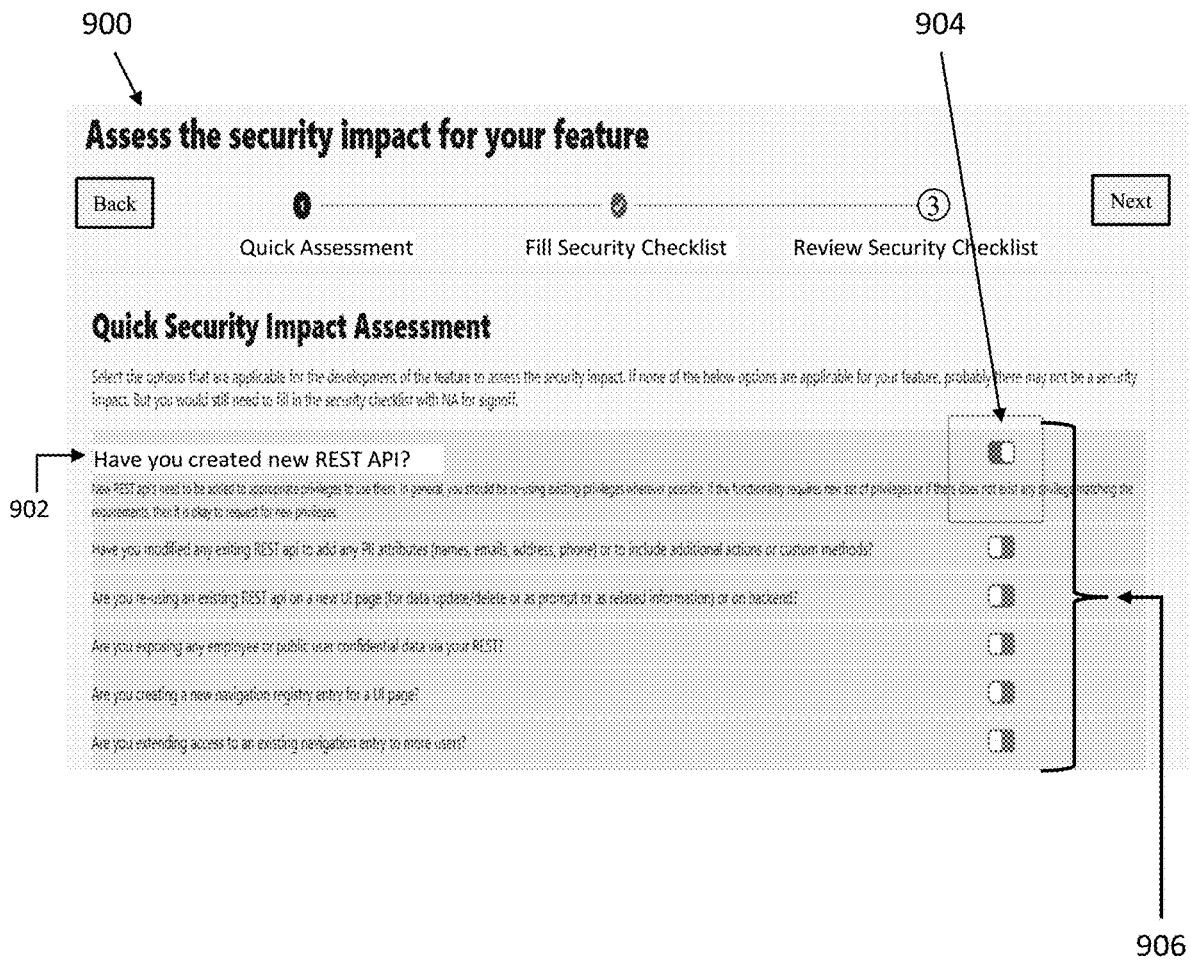
FIG. 9 illustrates a change in a field value on a data page that drives the data page related content configuration.

In block 106, when a user loads or otherwise activates/accesses a data page that has been configured with page links, the system initiates monitoring user activity and interaction with the data page. For example, the user may access a data form on a website, which needs data to be entered in input fields and/or questions answered in input fields. An example data page/form is shown in FIG. 9.

When an input field on the data page is engaged by a user and data is entered into the field, the input is detected by the system and this activates the page link configuration logic (this is described more in FIG. 5). Based on the link assignments and defined criteria rules to trigger related links, the system identifies and highlights specified related links from all the other available related links. Detailed functions of block 106 will be described in greater detail in relation to FIG. 8.

Figure 10A:
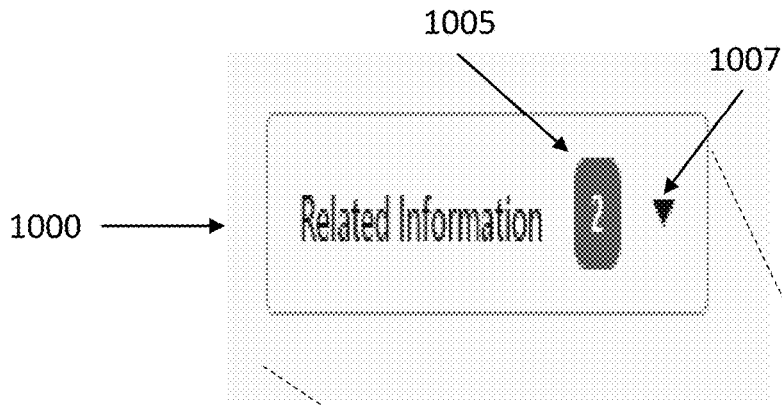
FIG. 10a illustrates a widget with a badge highlighted and the number of related content items shown.
Figure 10B:
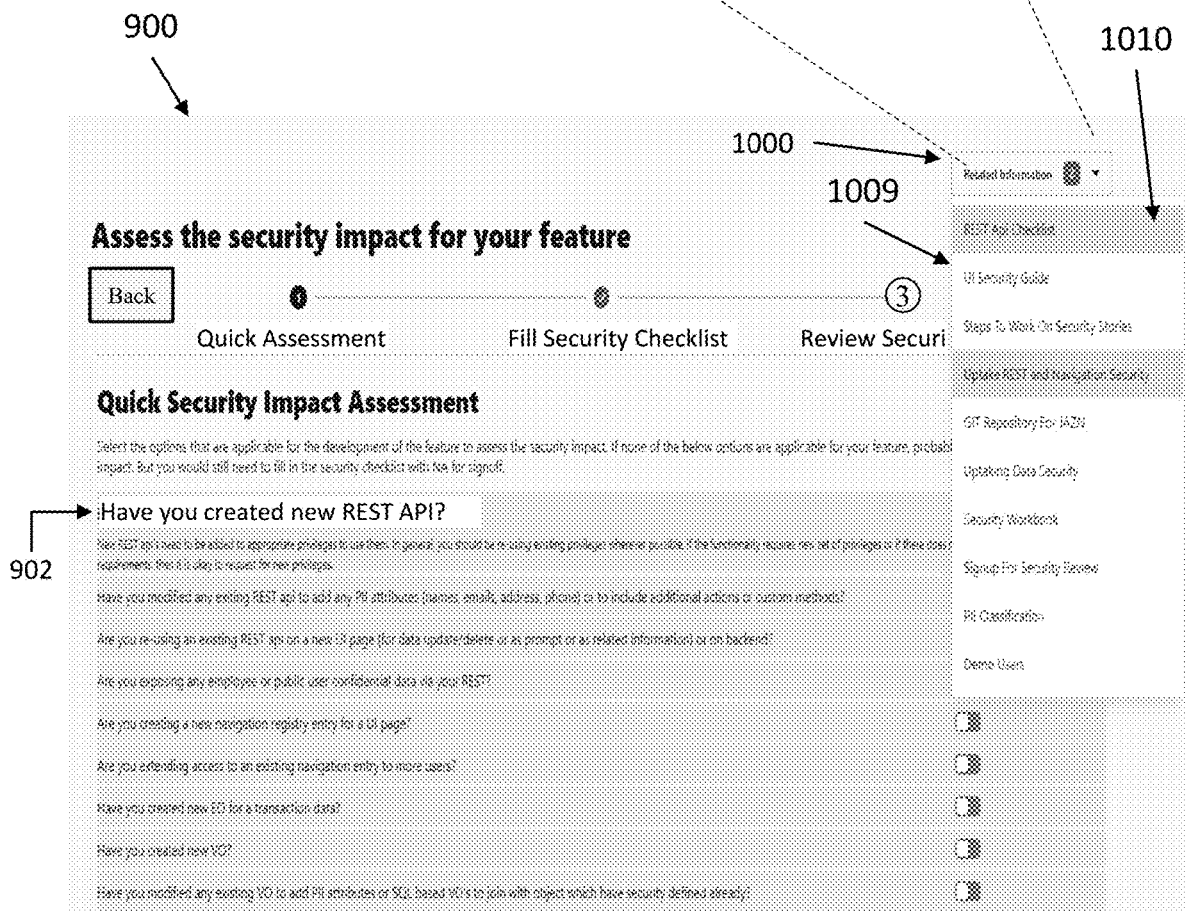
FIG. 10b illustrates a list of all the available related links/content/information with the most relevant links/content/information being highlighted.

In block 108, after execution of the page link configuration logic is performed on the associated input field, the system generates and displays a list of related links. Specified links in the list are highlighted (visually distinguished) from the other links based on the defined criteria for the links as determined from the page link configuration. A graphical badge is generated and displayed with additional information about the related links associated with the particular input field. Examples are shown in FIGS. 10a and 10B. The related links are displayed on the display screen and are selectable to activate the links.

At block 110, in response to the user selecting one of the highlighted links, the system activates the selected link. This may include navigating to a URL address of the selected link that displays additional information about the associated input field, or displaying a pop-up box or window that provides the additional information. Thus, the present system, as further described below, assists a user to identify hidden information about a data page that may not be found or even noticed by the user.

Configuring Related Information Links

Figure 3:
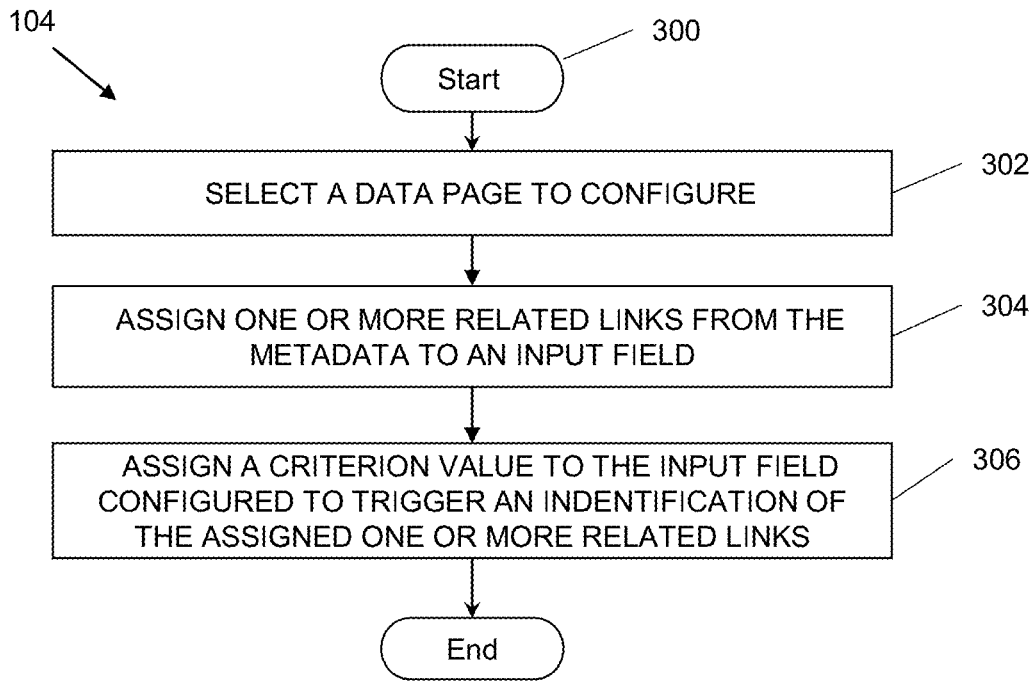
FIG. 3 illustrates one embodiment for a method for configuring related links.

With reference to FIG. 3, one embodiment of the page configuration block 104 (from FIG. 1) is illustrated. FIG. 3 illustrates a computer-implemented method 300 for configuring related links on a data page. The method 300 is performed by at least a processor of a computer system that accesses and interacts with memories and/or data storage devices. For example, the processor at least accesses and reads/writes data to the memory and processes network communications to perform the actions of FIG. 3.

As shown in FIG. 3, the page link configuration step 104 is initiated in block 302 when the system administrator selects a data page 200 to configure. In one embodiment, selection of a data page is performed on a page selection screen or dialog box.

Figure 4:
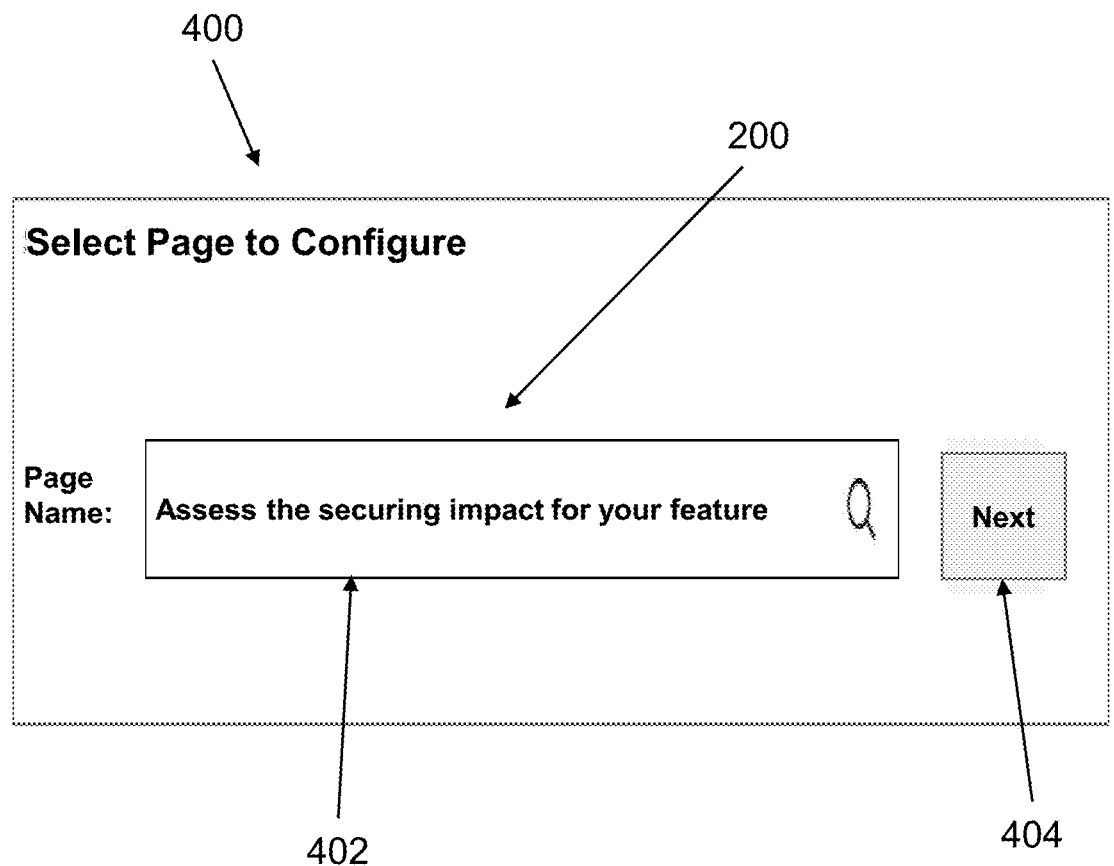
FIG. 4 illustrates a selection of a data page to be configured by a user on a user interface.

As shown in FIG. 4, one embodiment of a page selection screen/dialog box 400 is shown that may be displayed as part of the user interface for page link configuration. In particular, on the page selection screen 400 of the user interface, the system administrator selects the data page 200 to be configured by identifying the data page by page name and/or page ID. In this example, the page name is "Assess the securing impact for your feature" which is entered into a page name input field 402 (or selected from a list of available pages). When completed, clicking a "Next" button 404 continues the page link configuration process.

Returning back to FIG. 3, once the desired data page 200 has been selected, the system retrieves the selected page from a database of available pages and retrieves the metadata associated with the selected page. As previously explained, the data page includes a plurality of input fields (and other content) and the metadata includes a plurality of related links that are associated with the data page. This retrieved information is stored in memory. As also previously explained, the related links are active hyperlinks that when selected, display (or navigate to) additional information that has been associated with the content of the data page. For example, the additional information may include an explanation for entering data into one of the input fields on the data page.

With continued reference to FIG. 3, in block 304, the page link configuration provides options to assign one or more related links from the metadata 204 to an input field 202 on the data page, wherein the one or more related links 206 are active links to additional information specifically regarding the input field 202. This type of assignment is helpful because the data page may have many related links (e.g., 10-15 links) that are defined in the metadata but only 1 or 2 links may be related to a particular input field. The other links may be related to different input fields or different content on the data page.

After the system administrator assigns one or more related links 206 from the metadata 204 to the selected input field 202, in block 306, the page link configuration process allows the system administrator to assign a criterion value to the input field 202 such that the criterion value is configured to trigger an identification of the assigned one or more related links 206. A more detail explanation is provided in FIG. 5.

With reference to FIG. 5, one embodiment of a sample configuration page 500 is illustrated. The configuration page 500 is one implementation of the page link configuration interface described above. The configuration page 500 includes a user interface for configuring the selected data page by assigning related links to input fields and assigning criteria values to trigger the assigned related links. A "Field" column 502 on the configuration page 500 allows users to select the input field within the data page which can trigger a related link highlighting. The selection of the desired field will return the list of available fields by looking at the metadata 204 of the data page that was selected previously.

A "Criteria" column 504 allows a user to select an operator to perform a comparison with an assigned value identified in a "Value" column 506. For example, the criteria may be a drop down menu that allows the user to select operators such as =, <, <=, >, >=, !=, is null, "has any value" etc. It is to be understood that this is just a sample list of operators, and the list can have more options. The "Value" column 506 can be used to enter an assigned value to be compared to whatever is inputted in the associated input field 502 in run time. The value column 506 field is enabled if the user has selected a comparison operator for the criteria. Otherwise, the value column 506 will be disabled since no criteria is defined. For example, if the criteria column has no value or is null, the "Value" column 506 is disabled.

A "Link" column 508 allows the user to select a related link identifier that is defined in the metadata and is an available related link for the selected page. In one embodiment, the configuration page 500 is configured to generate and display an available links table that provides the user a list of available links that may be selected (FIG. 7 shows an example of an available links table 700). Clicking on the link column 508 or a link search icon may initiate the display of the available links table. For example, in row 515, a link ID identifier "S10" is selected and appears in the link column 508. The link ID may be retrieved from the available links table (see for example FIG. 7, link identifiers "Links_ID" 702).

This is the mapping which assigns the identified link "S10" (link column 508) to the associated input field "Have you created new REST API" (field column 502) on the data page along with the criteria and value triggers. With this configuration, the system will cause the assigned link S10 to be identified and highlighted when an inputted value entered into the field satisfies the criteria defined by combination of the "Criteria" column 504 and the "Value" column 506. As discussed earlier, the metadata contains the related link information available that has been configured for each data page.

A "Description" column 510 shows the name of the link (Link Name) that is displayed to the end user on the user interface for reference purposes.

Thus, in FIG. 5, the configuration page 500 configures the selected data page for display on a user interface by defining a function and assessment (criterion and value) to be executed when data is entered into a defined input field on the data page. For example, each row in the configuration page 500 defines a link assignment 508 and trigger rule (criteria 504 and value 506) to an input field 502. With reference to Row 515, this row is directed to input field "Have you created new REST API", which is one input field on the selected data page being configured. The configuration 500 assigns this input field to related link 510, where the link S10 is named and described as "Rest API CheckList" (description column 510).

Thus, the present system implements functionality to a web page and display system that helps a user identify hidden information from metadate about the related links, which is an improvement over prior systems. The present system provides a unique page configuration that assigns links to input fields and applies trigger conditions/rules for dynamically triggering the link assignments based on user action on an input field, which provides an improved dynamic functionality to data pages.

The execution of the configuration and functions performed may be described as follows. The system monitors the data page in real-time to detect input of any values into an input field. If a value "Data" is entered into input field called "Have you created new REST API", then the criteria function is executed to determine: does the entered "Data"=Y (from value column 506). If they are equal, then the assigned link 510 is triggered for identification and will be counted in the graphical badge. Also note that configuration page 500 has another row 520 that assigns link S3 to the same input field "Have you created new REST API?" Thus, two links are triggered in this example when a user enters "Y" into the corresponding input field. Thus, the number of triggered links is "2" which are counted for the graphical badge. Of course, multiple links may be assigned to the same input field when the multiple links are all related to a particular input field. A more detailed explanation of the process is described with reference to FIG. 8.

With continued reference to FIG. 5, the configuration page 500 may include an Add button 512 that is configured to add more rows to the configuration remove button 514 is configured to delete a selected row in the configuration page 500. A save button 516 may be configured to save the data page configuration. In particular, upon clicking the save button 516, the configuration of the data page is saved into a database as metadata or as configuration data. This is used by the system to monitor user activity and interaction with the data page in real-time and execute the rules created for the link assignments in the configuration page 500.

In another embodiment of the configuration page 500, attention is directed to FIG. 6, where a configuration page 600 is illustrated for configuring a data page called "Invoice Entry." In this embodiment, the configuration page 600 has defined three rows 605, 610, 615 of link assignments for three input fields that occur on the data page. The three input fields are listed under the field column 502. For example, in row 610, input field "Amount" is assigned to link ID "INV8." When a user enters a number into the "Amount" input field on the data page, the system triggers execution of the defined criteria and value in columns 504 and 506, respectively. If the inputted number is "15,000" then the comparison operation is performed as: 15,000>=10,000. The result is true (or yes) which then triggers the assigned link INV8 to be identified and highlighted on the data page (and in the badge as described below). If the result is false or no, then the link INV8 is not identified or highlighted as part of the badge.

With reference to FIG. 7, one embodiment of the available links table 700 is illustrated. In one embodiment, the available links table 700 is a table of links that may be created from the metadata of an associated data page. As previously stated, the metadata of a data page includes all the related links that are associated with the data page. The table 700 may be generated and displayed to a user to allow the user to select and assign an available link to a desired input field (using the configuration page 500).

As shown in FIG. 7, in one embodiment, the available links table 700 includes a number of columns that identify parameters or attributes for each link identified in each row. For example, in row 715, A LinksID column 702 stores the link identifier which is link "S10." A classification column 704 stores a classification of the link, in this case, is "Security." A display name column 706 stores a link name "REST API Checklist" used for display that describes the link. A link URL column 708 stores the actual URL of the link. A link description column 710 stores a description of the link that provides more detail information.

This information in the available links table 700 may assist the user to select the appropriate relevant link for assignment to a selected input field. The user can repeat the process for other input fields on the data page by adding new rows to the configuration page 500 or 600. After one or more input field of the data page are configured and assigned to related links, the data page can be used in real-time operation to perform the present features.

Controlling a Display of Data Page and Related Links

After the data page is configured with link assignments and criteria based on block 104 in method 100 (from FIG. 1 and FIG. 5 link assignments), the data page is ready for real-time operation. The operation of present system for processing the configured data page includes blocks 106, 108, and 110 from method 100 of FIG. 1. Returning back to FIG. 1, in block 106, when a user loads or otherwise activates/accesses a data page that has been configured with page links, the system initiates monitoring user activity and interaction with the data page. Functions of block 106 will be described with reference to method 800 of FIG. 8 and associated example data page 900 of FIG. 9.

For example, the user may access a data form on a website, which needs data to be entered in input fields and/or questions answered in input fields. An example data page/form is shown in FIG. 9. FIG. 9 shows an example data page/form corresponding to the previously configured data page 500 (FIG. 5) called "Assess the security impact for your feature." Data page 900 includes a plurality of input fields 902, which in this example are configured as Yes/No toggle buttons.

In response to a user accessing the data page 900, the data page 900 is activated to allow input to be entered in the plurality of input fields 902. Real-time actions of the system performed for block 106 are described in FIG. 8.

Figure 8:
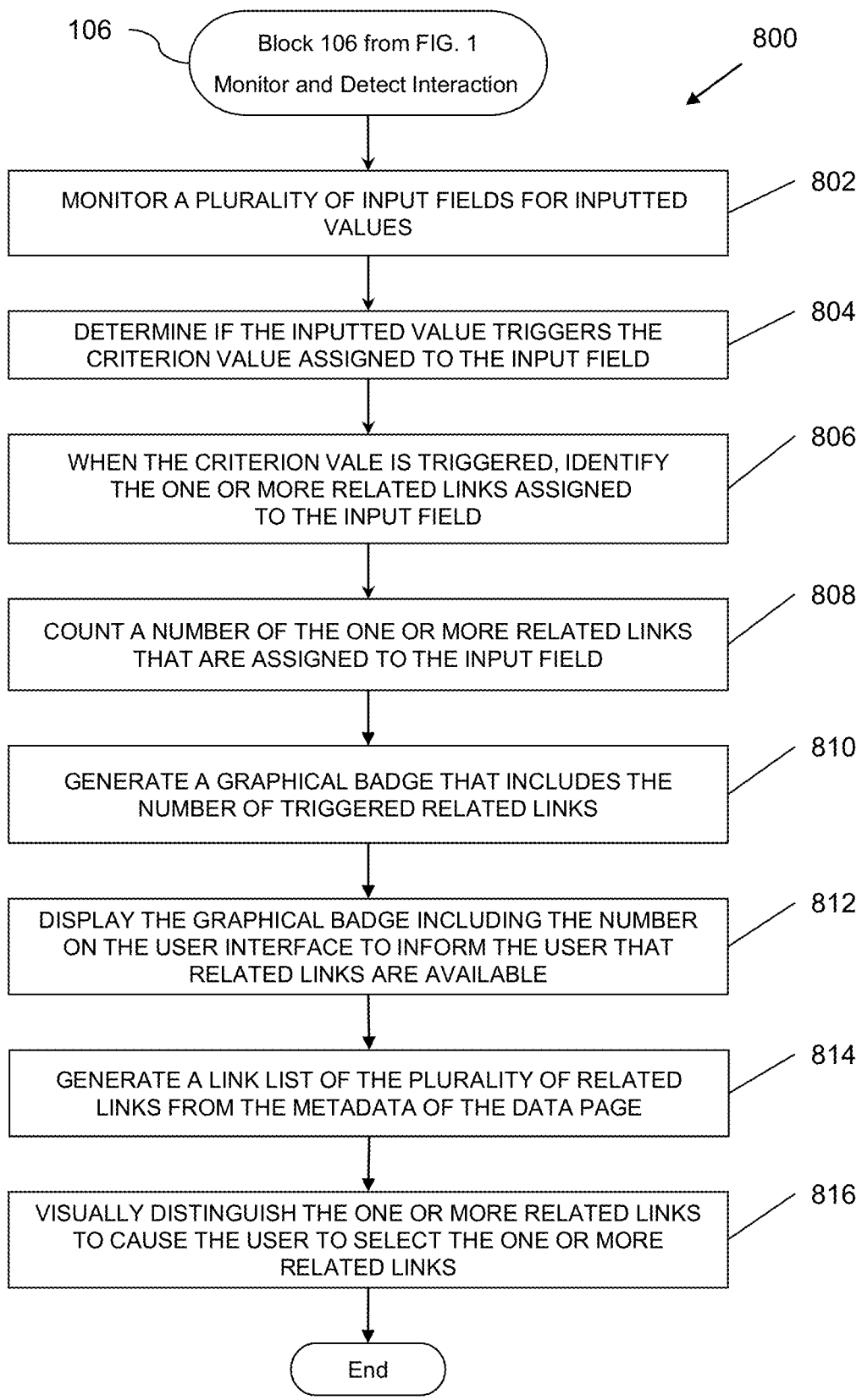
FIG. 8 illustrates one embodiment for a controlling a display of configured related links.

With reference to FIG. 8, a computer-implemented method 800 is illustrated that describes one embodiment for identifying and displaying the configured related links and controlling the display screen with additional graphical information. The method 800 is performed by at least a processor of a computer system that accesses and interacts with memories and/or data storage devices. For example, the processor at least accesses and reads/writes data to the memory and processes network communications to perform the actions of FIG. 8. In one embodiment, the method 800 is implemented by a computing system including a page link configuration module 1230 (shown FIG. 12) that is loaded into memory and executed to perform the actions of method 800 and/or their equivalents.

At block 802, the system loads the page configuration data 500 associated with the data page 900 into memory. The system also initiates monitoring of the plurality of input fields 902 on the data page 900 for user interaction. The interaction may include inputting data values, toggling Yes/No buttons, or other type of input.

At block 804, in response to a new input value being detected and received in an input field, the system executes the criteria associated with the corresponding input field that is defined in the page configuration data 500. For example, the system determines if the new input value triggers the criterion value assigned to the input field.

For example, as shown in FIG. 9, data page 900 includes an input field that is a toggle button/slider 904. The toggle slider 904 has been changed by moving the slider to the right side. This represents a "Yes" answer to the question of the corresponding field "Have you created new REST API?" This movement of the slider 904 to the right side is queried to determine if the new input value triggers the criterion value assigned to the field "Have you created new REST API?". For example, movement of the slider 904 to the right side equates to "Y" (yes) as the answer to the question and movement to the left side equates to "N" (no).

As seen in FIG. 5, in row 515 and row 520, the field "Have you created new REST API?" has been defined and configured with a criteria and value of "=Y." When the criterion/criteria is triggered or otherwise satisfied, the related link assignments that will be triggered are links "S10" and "S3." In this example, the toggle slider 904 is set to "Y" and this satisfies the criteria=Y from the page configuration data 500.

Returning back to FIG. 8, in 806, when the criterion value is triggered, one or more related links that are assigned to the input field are identified. The system identifies the related links by performing all the criteria tests associated with the particular input field as defined in the page configuration data. In this example, two related links are triggered and these two links are identified.

In 808, the system then counts a number of the one or more related links that are assigned to the input field 902 and have been triggered by the new input value. In this example, the number counted is two (2) links. When additional input fields changed to contain input values, additional criteria may be satisfied, Thus, an additional number of related links will be triggered and identified causing the number of counted links to increase. In response to the user changing values of input fields, this may cause the criterion for that input field to not be satisfied. Thus, the assigned related link (if previously triggered and counted) is then removed and the badge counter decreases by one.

In 810, the system generates a graphical badge to provide link information that was identified. In one embodiment, the graphical badge is configured to include the number of related links identified (triggered links) and counted for the input fields. One embodiment of the graphical badge is shown in FIG. 10A where a widget 1000 called "Related Information" is configured with the graphical badge 1005. The graphical badge 1005 is shown displaying a link count of "2" which is the number of links identified and counted in the previous step.

In 812, the system displays the graphical badge including the counted number of links (triggered links) on the user interface. This displaying action serves to inform the user that related links are available for the page so that the user is notified of the links. In one embodiment, the graphical badge is kept hidden and not displayed as long and the counted number of links is zero, meaning there are no related links pertaining to the data the user entered in an input field.

In particular, as shown in FIGS. 10*a* and 10*b*, for each of the criterion that is satisfied, the counter of the graphical badge 1005 on the widget 1000 is incremented by 1. This will make the badge 1005 visible and show the number count on the widget 1000. In one embodiment, a background color of an html element 1010 (such as a display name) with the linkID is changed to highlight the html element 1010 with the linkID.

In one embodiment, when the graphical badge 1005 is displayed with a count number greater than zero but then the counted number of links changes to zero, the graphical badge 1005 is removed/hidden from the display. For example, when the values of input fields are changed which causes the associated criterion to change from being satisfied (triggered) to not be satisfied (not triggered), the assigned related links are no longer triggered. Thus, the badge link counter 1005 on the widget 1000 is decreased/decremented correspondingly. In response to the badge link counter 1005 becoming zero, the graphical badge 1005 is removed from the widget 1000 on the display or otherwise hidden.

It is to be understood that when an input value is changed that causes the associated criterion to fail (is not satisfied), the counter on the widget 1000 is decremented by 1, meaning that one less link has been triggered (if the link was already highlighted since the link was previously triggered). This will adjust and decrement the badge count by the number of links that were untriggered due to the change in input value. When the badge count reaches zero, the system removes/hides the badge count 1005 from the display. Furthermore, if the criterion is not satisfied, the background color of the html element 1010 with the link ID is changed to from being highlighted to being unhighlighted. Furthermore, the color changes can be accommodated by style classes. Also, note that if the criteria operator is "is null" or "has a value", then the value from the configuration is not required and the comparison operation happens only with the new value is received during a run time.

Returning back to FIG. 8, in 814, the system generates a link list 1009 (shown in FIG. 10*b*) of the plurality of related links from the metadata of the data page. The link list 1009 may be generated by the user selecting or activating the related information widget 1000 or selecting an option, for example, a drop down arrow 1007 shown on the widget 1000 in FIG. 10*a*. The link list 1009 is generated from the metadata that includes all the related link information and is displayed on the data page. The link list 1009 shows a list of all related links that are associated to the page, which in the example includes ten related links. Of course, many of these related links are not actually related to the current input field 902 in question. Thus, a user would not know how to identify and select the actual related link for input field 902. That is the function of the previous steps that identify all the assigned related links.

In 816, the one or more related links that are assigned to and triggered by the input field are visually distinguished in the link list 1009. This function identifies the related links that are actually relevant to the input field and visually distinguishes the identified links (e.g., highlighted) to draw the user's attention to the highlighted links. The other unhighlighted links are related to the current data page but are not related to the current input field. In this manner, the system automatically dynamically identifies the actually relevant links based on the user's actions in the input fields and helps to cause the user to select the one or more actually relevant links that are visually distinguished (e.g., highlighted from all other related links). This is an improvement over previous systems that did not have any page configuration and could not identify related links specific to an input field.

With reference to FIG. 10B, in the link list 1009, there are two links highlighted based on the previously described determinations of input values and criterion. The two highlighted links are actually relevant to the user's current actions on the associated input field. Thus, the user does not need to guess which related links are actually relevant to the current input field.

In particular, as shown in FIG. 10*b*, the page link configuration module 1230 generates a link list 1009 of the plurality of related links 1010 from the metadata of the data page 900, wherein the one or more related links 1010 that are assigned to and triggered by the input field 902 are visually distinguished in the link list 1009 to cause the user to select the one or more related links 1010.

As shown in FIGS. 10*a* and 10*b*, the badge 1005 includes a badge count of "2" (representing two links were identified) on the related information widget 1000. Upon clicking on the related information widget 1000, the system administrator is presented with the list 1009 of all the available related links 1010 for the given data page. Furthermore, the links 1010 "REST Api Checklist" and "Uptake REST and Navigation Security" are highlighted since these two links were triggered by input values (and counted in the badge count 1005). This is based on the context data in data sheet 900. The slider 904 on the data page 900 is (moved to the right) selected to "Y". Hence the system identifies, highlights, and displays the related link 1010 that is relevant to that data being input. The badge count is also set as 2, thereby informing the user that there are two (2) further pieces of information which might be helpful based on the current selection/data for the input field 902.

Figure 11A:
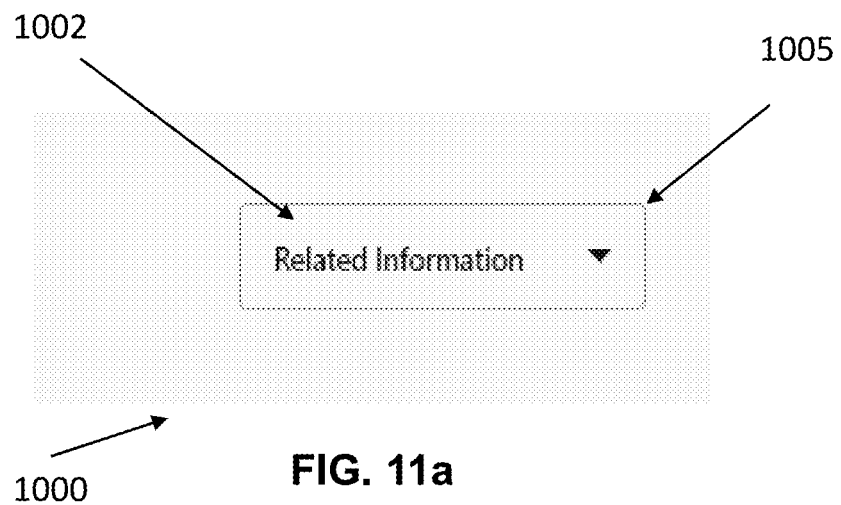
FIG. 11a illustrates a widget with no link information being available.
Figure 11B:
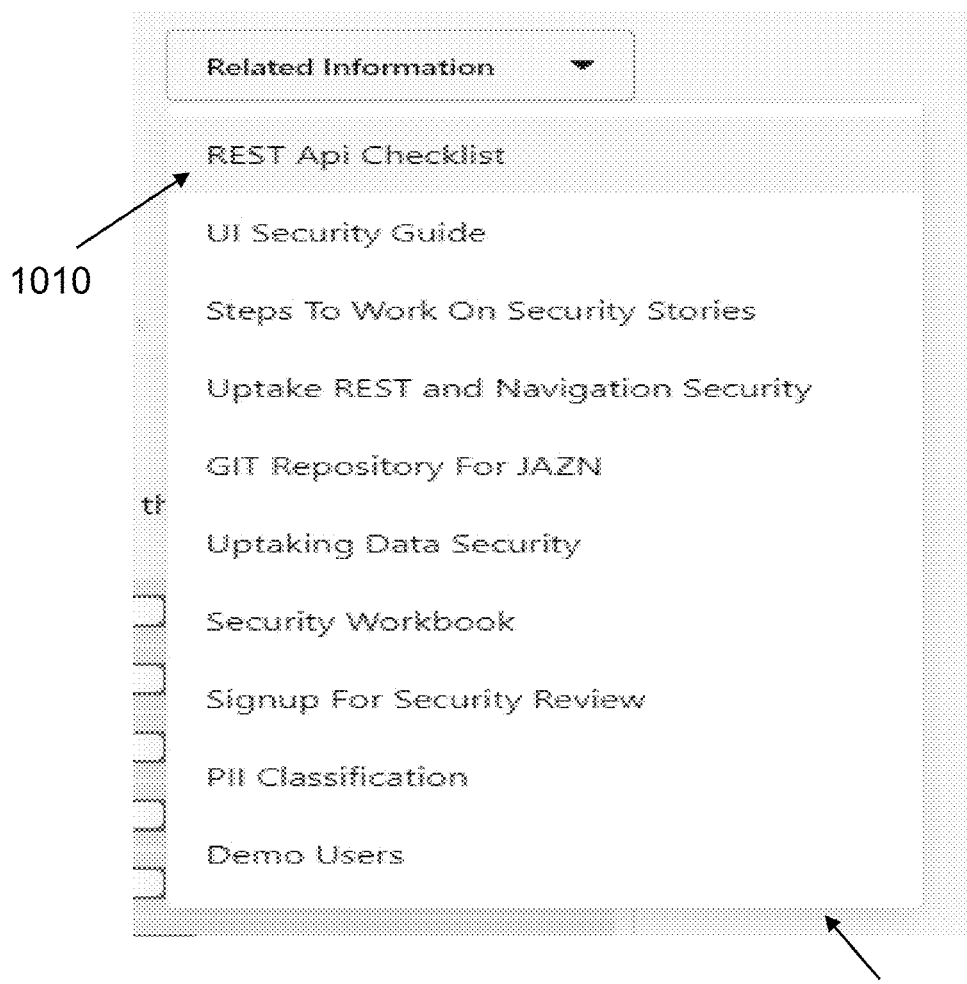
FIG. 11b illustrates a list of the available related links/content/information.

With reference to FIGS. 11*a* and 11*b*, if there is no link 1010 available based on contextual data, the widget 1000 presents to the user that there are no available related links 1010 pertaining to the data user entered. In particular, the badge counter 1005 does not display any count value. The html element 1010 with the linkID is not changed to highlight anything.

With reference to FIG. 10*b*, if the user desires to see what further information the highlighted link 1010 may contain, the user can select one of the highlighted links 1010.

In response to one of the highlighted links 1010 being selected, the page link configuration module 1230 activates the selected link 1010 and displays the additional information on the user interface. This is associated with block 110 in FIG. 1. Thus, the present system assists a user to identify hidden information about a data page that may not be found or even noticed by the user.

Computing Device Embodiment

Figure 12:
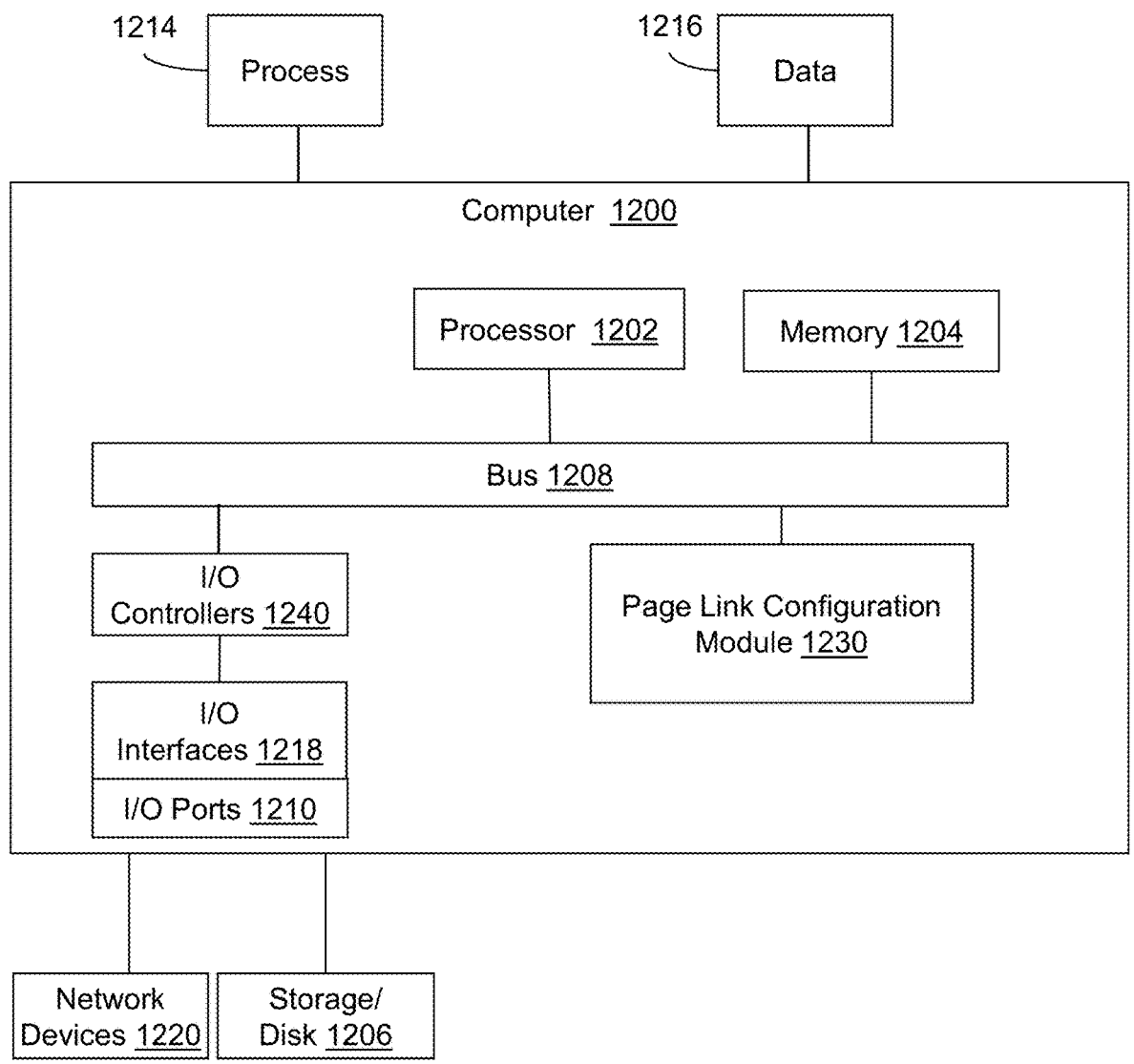
FIG. 12 illustrates an embodiment of a special purpose computing system configured with the example systems and/or methods disclosed.

FIG. 12 illustrates an example special purpose computing device that is configured and/or programmed with one or more of the example systems and methods described herein, and/or equivalents. The example computing device may be a computer 1200 that includes a processor 1202, a memory 1204, and input/output ports 1210 operably connected by a bus 1208. In one example, the computer 1200 may include a page link configuration module 1230 for configuring related information links and controlling a display, as performed by the method of FIGS. 1, 3 and 8. In different examples, the logic 1230 may be implemented in hardware, a non-transitory computer-readable medium with stored instructions, firmware, and/or combinations thereof. While the logic 1230 is illustrated as a hardware component attached to the bus 1208, it is to be appreciated that in other embodiments, the logic 1230 could be implemented in the processor 1202, stored in memory 1204, or stored in disk 1206.

In one embodiment, logic 1230 or the computer is a means (e.g., structure: hardware, non-transitory computer-readable medium, firmware) for performing the actions described. In some embodiments, the computing device may be a special purpose server operating in a Cloud computing system, a server configured in a Software as a Service (SaaS) architecture, a smart phone, laptop, tablet computing device, and so on.

Describing an example configuration of the computer 1200, the processor 1202 may be a variety of various specially programmed processors including dual microprocessor and other multi-processor architectures. A memory 1204 may include volatile memory and/or non-volatile memory. Non-volatile memory may include, for example, ROM, PROM, and so on. Volatile memory may include, for example, RAM, SRAM, DRAM, and so on.

A storage disk 1206 may be operably connected to the computer 1200 via, for example, an I/O controller 1240, an input/output (I/O) interface (e.g., card, device) 1218 and an input/output port 1210. The disk 1206 may be, for example, a magnetic disk drive, a solid-state disk drive, a floppy disk drive, a tape drive, a Zip drive, a flash memory card, a memory stick, and so on. Furthermore, the disk 1206 may be a CD-ROM drive, a CD-R drive, a CD-RW drive, a DVD ROM, and so on. The memory 1204 can store a process 1214 and/or a data 1216, for example. The disk 1206 and/or the memory 1204 can store an operating system that controls and allocates resources of the computer 1200.

The computer 1200 may interact with input/output (I/O) devices via the I/O controller 1240, the I/O interfaces 1218, and the input/output ports 1210. Input/output devices may be, for example, a keyboard, a microphone, a pointing and selection device, cameras, video cards, displays, the disk 1206, the network devices 1220, and so on. The input/output ports 1210 may include, for example, serial ports, parallel ports, and USB ports.

The computer 1200 can operate in a network environment and thus may be connected to the network devices 1220 via the I/O controller 1240, the I/O interfaces 1218, and/or the I/O ports 1210. Through the network devices 1220, the computer 1200 may interact with a network. Through the network, the computer 1200 may be logically connected to remote computers. Networks with which the computer 1200 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a Cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101. It is inconsistent with the present disclosure to interpret that any of the functions performed and/or claimed herein can be performed in the human mind or manually.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor specially programmed with an algorithm for performing the disclosed methods, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

The invention claimed is:

1. A method for configuring related information links and controlling a display, wherein the method comprises:
   in response to a user activating a data page on a user interface, wherein the data page includes a plurality of input fields for receiving input values:
   monitoring the plurality of input fields for inputted values;
   in response to a first value being input into a first input field of the plurality of input fields:
   (i) identifying one or more related links assigned to the first input field, wherein the one or more related links are active links to additional information regarding the first input field;
   (ii) counting a number of the one or more related links that are assigned to the first input field; and
   (iii) generating and displaying, on the display, a graphical badge that includes the number of the one or more related links to inform the user that related links are available for the first input field; and
   in response to a first link being selected from the one or more related links, activating the first link and display the additional information regarding the first input field on the user interface.

2. The method of claim 1, wherein identifying the one or more related links assigned to the first input field further comprises:
   determining if the first value triggers a criterion value assigned to the first input field;
   when the criterion value is triggered, identifying the one or more related links assigned to the first input field; and
   generating, on the display, a link list of a plurality of data page related links from metadata of the data page, wherein the one or more related links assigned to the first input field are visually distinguished in the link list on the display to cause the user to select the one or more related links.

3. The method of claim 1, further comprising:
   identifying a plurality of data page related links that are associated to the data page but are not visible on the data page;
   wherein the one or more related links assigned to the first input field are a subset of the plurality of data page related links; and
   in response to the first value being input into the first input field, visually distinguishing the one or more related links assigned to the first input field on the user interface.

4. The method of claim 1, wherein generating the graphical badge that includes the number comprises:
  generating and displaying a counter; and
  generating and displaying a background color of a display name associated with the identified one or more related links.

5. The method of claim 1, further comprising configuring the data page for display on the user interface by at least:
  (i) assigning related links from metadata of the data page to the first input field; and
  (ii) assigning a criterion value to the first input field configured to trigger an identification of the related links assigned to the first input field.

6. The method of claim 5, further comprising:
  in response to the first value being changed that causes the criterion value assigned to the first input field to change from being triggered to not being triggered, decrement the number of the one or more related links; and
  in response to the number counted of the related links changing from being greater than zero to being zero, removing the graphical badge from the user interface.

7. The method as in claim 1, further comprising:
  generating, on the display, a link list of a plurality of data page related links from metadata of the data page;
  visually distinguishing the one or more related links assigned to the first input field in the link list on the display to cause the user to select the one or more related links.

8. A non-transitory computer-readable medium storing computer-executable instructions that, when executed by a computer including a processor, cause the computer to perform functions configured by the computer-executable instructions, wherein the instructions comprise:
  in response to a user activating a data page on a user interface, wherein the data page includes a plurality of input fields for receiving input values:
  monitor the plurality of input fields for inputted values;
  in response to a first value being input into a first input field of the plurality of input fields:
    (i) identify one or more related links assigned to the first input field, wherein the one or more related links are active links to additional information regarding the first input field;
    (ii) count a number of the one or more related links that are assigned to the first input field; and
    (iii) generate and display, on the display, a graphical badge that includes the number of the one or more related links to inform the user that related links are available for the first input field; and
  in response to a first link being selected from the one or more related links, activate the first link and display the additional information regarding the first input field on the user interface.

9. The non-transitory computer-readable medium of claim 8, wherein the instructions for identifying the one or more related links assigned to the first input field further comprise instructions that, when executed by at least the processor, cause the processor to:
  determine if the first value triggers a criterion value assigned to the first input field;
  when the criterion value is triggered, identify the one or more related links assigned to the first input field; and
  generate, on the display, a link list of a plurality of data page related links from metadata of the data page, wherein the one or more related links assigned to the first input field are visually distinguished in the link list on the display to cause the user to select the one or more related links.

10. The non-transitory computer-readable medium of claim 8, further comprising instructions that, when executed by at least the processor, cause the processor to:
  identify a plurality of data page related links that are associated to the data page but are not visible on the data page;
  wherein the one or more related links assigned to the first input field are a subset of the plurality of data page related links; and
  in response to the first value being input into the first input field, visually distinguish the one or more related links assigned to the first input field on the user interface.

11. The non-transitory computer-readable medium of claim 8, wherein the instructions for generating the graphical badge that includes the number further comprise instructions that, when executed by at least the processor, cause the processor to:
  generate and display a counter; and
  generate and display a background color of a display name associated with the identified one or more related links.

12. The non-transitory computer-readable medium of claim 8, further comprising instructions that, when executed by at least the processor, cause the processor to:
  configure the data page for display on the user interface by at least:
    (i) assigning related links from metadata of the data page to the first input field; and
    (ii) assigning a criterion value to the first input field configured to trigger an identification of the related links assigned to the first input field.

13. The non-transitory computer-readable medium of claim 12, further comprising instructions that, when executed by at least the processor, cause the processor to:
  in response to the first value being changed that causes the criterion value assigned to the first input field to change from being triggered to not being triggered, decrement the number of the one or more related links; and
  in response to the number counted of the related links changing from being greater than zero to being zero, remove the graphical badge from the user interface.

14. The non-transitory computer-readable medium of claim 8, further comprising instructions that, when executed by at least the processor, cause the processor to:
  generate, on the display, a link list of a plurality of data page related links from metadata of the data page:
  visually distinguish the one or more related links assigned to the first input field in the link list on the display to cause the user to select the one or more related links.

15. A computing system, comprising:
  at least one processor connected to at least one memory comprising a non-transitory computer readable medium;
  a page link configuration module stored on the memory and including instructions that, when executed by the at least one processor, cause the at least one processor to:
  in response to a user activating a data page on a user interface, wherein the data page includes a plurality of input fields for receiving input values:
  monitor the plurality of input fields for inputted values;
  in response to a first value being input into a first input field of the plurality of input fields:
    (i) identify one or more related links assigned to the first input field, wherein the one or more related links are active links to additional information regarding the first input field;
(ii) count a number of the one or more related links that are assigned to the first input field; and
(iii) generate and display, on the display, a graphical badge that includes the number of the one or more related links to inform the user that related links are available for the first input field; and in response to a first link being selected from the one or more related links, activate the first link and display the additional information regarding the first input field on the user interface.

16. The computing system of claim 15, wherein the instructions for identifying the one or more related links assigned to the first input field further comprise instructions that, when executed by at least the processor, cause the processor to:
determine if the first value triggers a criterion value assigned to the first input field;
when the criterion value is triggered, identify the one or more related links assigned to the first input field; and
generate, on the display, a link list of a plurality of data page related links from metadata of the data page, wherein the one or more related links assigned to the first input field are visually distinguished in the link list on the display to cause the user to select the one or more related links.

17. The computing system of claim 15, further comprising instructions that, when executed by at least the processor, cause the processor to:
identify a plurality of data page related links that are associated to the data page but are not visible on the data page;
wherein the one or more related links assigned to the first input field are a subset of the plurality of data page related links; and
in response to the first value being input into the first input field, visually distinguish the one or more related links assigned to the first input field on the user interface.

18. The computing system of claim 15, wherein the instructions for generating the graphical badge that includes the number further comprise instructions that, when executed by at least the processor, cause the processor to:
generate and display a counter; and
generate and display a background color of a display name associated with the identified one or more related links.

19. The computing system of claim 15, further comprising instructions that, when executed by at least the processor, cause the processor to:
configure the data page for display on the user interface by at least:
(i) assigning related links from metadata of the data page to the first input field; and
(ii) assigning a criterion value to the first input field configured to trigger an identification of the related links assigned to the first input field.

20. The computing system of claim 19, further comprising instructions that, when executed by at least the processor, cause the processor to:
in response to the first value being changed that causes the criterion value assigned to the first input field to change from being triggered to not being triggered, decrement the number of the one or more related links; and
in response to the number counted of the related links changing from being greater than zero to being zero, remove the graphical badge from the user interface.

* * * * *

UNITED STATES PATENT AND TRADEMARK OFFICE
CERTIFICATE OF CORRECTION

| | | |
|---|---|---|
| PATENT NO. | : 11,651,146 B2 | |
| APPLICATION NO. | : 17/722575 | |
| DATED | : May 16, 2023 | |
| INVENTOR(S) | : Tony P Thomas | |

It is certified that error appears in the above-identified patent and that said Letters Patent is hereby corrected as shown below:

In the Drawings

On sheet 3 of 12, in FIG. 3, under Reference Numeral 306, Line 2, delete "INDENTIFICATION" and insert -- IDENTIFICATION --, therefor.

On sheet 8 of 12, in FIG. 8, under Reference Numeral 806, Line 1, delete "VALE" and insert -- VALUE --, therefor.

In the Specification

In Column 1, Line 61, delete "1" and insert -- 1. --, therefor.

In Column 6, Line 19, delete "510," and insert -- S10, --, therefor.

In Column 6, Line 24, delete "metadate" and insert -- metadata --, therefor.

In Column 6, Line 38, delete "510" and insert -- S10 --, therefor.

In Column 6, Line 51, after "configuration" insert -- page 500 to create more assignments between input fields and related links. A --, therefor.

In Column 7, Line 23, delete "A" and insert -- a --, therefor.

In Column 8, Line 55, delete "satisfied," and insert -- satisfied. --, therefor.

In Column 12, Line 7, delete "on)." and insert -- on. --, therefor.

Signed and Sealed this
Twentieth Day of February, 2024

*Katherine Kelly Vidal*

Katherine Kelly Vidal
*Director of the United States Patent and Trademark Office*